(12) United States Patent
Frank et al.

(10) Patent No.: US 6,479,416 B1
(45) Date of Patent: *Nov. 12, 2002

(54) FIBROUS-FORMATION AEROGEL COMPOSITE MATERIAL CONTAINING AT LEAST ONE THERMOPLASTIC FIBROUS MATERIAL, PROCESS FOR THE PRODUCTION THEREOF, AND USE THEREOF

(75) Inventors: Dierk Frank, München (DE); Franz Thönnessen, Bobingen (DE); Andreas Zimmermann, Griesheim (DE)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/091,473

(22) PCT Filed: Dec. 20, 1996

(86) PCT No.: PCT/EP96/05760

§ 371 (c)(1),
(2), (4) Date: Jan. 20, 2000

(87) PCT Pub. No.: WO97/23675

PCT Pub. Date: Jul. 3, 1997

(30) Foreign Application Priority Data

Dec. 21, 1995 (DE) .......................................... 195 48 128

(51) Int. Cl.[7] .............................. D04H 1/54; B32B 5/16
(52) U.S. Cl. ...................... 442/417; 442/381; 442/389; 442/393; 442/394; 442/415

(58) Field of Search .................................. 442/417, 415, 442/394, 389, 117, 120, 121, 199, 285, 325, 361, 393, 44, 58; 156/276, 308.2; 427/180

(56) References Cited

U.S. PATENT DOCUMENTS

| 4,667,417 A | * | 5/1987 | Graser et al. ..................... 34/9 |
| 5,221,573 A | * | 6/1993 | Baigas, Jr. ................... 428/281 |
| 5,306,555 A | * | 4/1994 | Ramamurthi et al. ........ 428/289 |
| 5,656,195 A | * | 8/1997 | Mielke et al. ................. 252/62 |
| 6,143,400 A | * | 11/2000 | Schwertfeger et al. ... 428/304.4 |

FOREIGN PATENT DOCUMENTS

| DE | 3346180 A1 | | 8/1985 |
| EP | 0269462 A2 | | 6/1988 |
| EP | 0340707 A2 | | 11/1989 |
| EP | 0432438 A1 | | 6/1991 |
| JP | 08-034678 | * | 6/1996 |
| JP | 10-147664 | * | 6/1998 |
| JP | 11-028353 | * | 2/1999 |

* cited by examiner

*Primary Examiner*—Cheryl A. Juska

(57) ABSTRACT

The invention relates to a composite material which has at least one formation comprising fibers and aerogel particles and is characterised in that the fibrous formation contains at least one thermoplastic fibrous material to which the aerogel particles are bound and by which the fibers in the formation are bound together. It also relates to a process for the production of said composite material, and the use thereof.

18 Claims, No Drawings

FIBROUS-FORMATION AEROGEL COMPOSITE MATERIAL CONTAINING AT LEAST ONE THERMOPLASTIC FIBROUS MATERIAL, PROCESS FOR THE PRODUCTION THEREOF, AND USE THEREOF

The present invention relates to a composite material that contains at least one formation of fibrous material and aerogel particles, a process for the production of this, and the use thereof.

Because of their very low density, high porosity, and small pore diameters, aerogels, in particular those with porosities of greater than 60% and densities of less than 0.4 g/cm$^3$, exhibit very low thermal conductivity and for this reason are used as thermal insulating materials as is described, for example, in EP-A-O 171 722.

However, their great porosity results in very poor mechanical stability, both of the gel from which the aerogel is dried, as well as of the dried aerogel itself.

In the broadest sense, i.e., when regarded as "gels with air an the dispersed material," aerogels are manufactured by curing a suitable gel. When used in this sense, the term "aerogel" includes aerogels in the narrower sense, such as xerogels and cryogels. A gel is designated as an aerogel in the narrower sense if the liquid is removed from the gel at temperatures above the critical temperature and starting from pressures that are above the critical pressure. In contrast to this, if the liquid is removed from the gel subcritically, for example with the formation of a liquid-vapour boundary phase, then the resulting gel is, in many instances, referred to as xerogel. It should be noted that the gels according to the present invention are aerogels in the sense that they are gels with air as the dispersed material.

The process that shapes the aerogel in concluded during the sol-gel transition. Once the solid gel structure has been formed, the external shape can only be changed by size reduction, for example, by pulverizing. The material is too brittle for any other form of processing.

For many applications, however, it is necessary to use the aerogel in certain shapes. In principle, the production of shaped parts is possible even at the gel is being formed. However, the replacement of solvents, typically required during production, and which is governed by diffusion (with respect to aerogels, see, for example, U.S. Pat. No. 4 610,863 and EP-A 0 396 076; with respect to aerogel composite materials, sea, for example, WO 93/06044), and the drying—which is similarly governed by diffusion—lead to production times that are economically unacceptable. For this reason, it is appropriate to carry out a shaping stage after the production of the aerogel, which is to say, after it has been dried, and to do this without any essential change of the internal structure of the aerogel taking place with respect to the particular application.

For many applications, e.g., in order to insulate curved or irregularly shaped surfaces, it is necessary to use flexible panels or mats of insulating material.

DE-A 33 46 180 describes rigid panels from shaped bodies based on silicic acid aerogel obtained by flame pyrolysis combined with reinforcement by long mineral fibres. However, this silicic acid aerogel that is extracted from flame pyrolysis is not an aerogel in the above sense since it is not manufactured by curing a gel, and for this reason it has a completely different pore structure. Mechanically, it is much more stable and for this reason can be pressed without destruction of the microstructure, although it has a greater thermal conductivity than typical aerogels in the above sense. The surface of a moulded body such as this is extremely delicate and for this reason must be hardened, as by the use of a binder, or by being covered with a film. Furthermore, the resulting shaped body cannot be compressed.

DE-A-44 18 843 describes a mat of a fibre-reinforced aerogel. It is true that, because of the very high proportion of aerogel, these mats display a very low level of thermal conductivity, but they require relatively protracted production times because of the above-described diffusion problems. In particular, it is only possible to manufacture thicker mats by combining a number of thinner mats, and this involves additional outlays.

It is the task of the present invention to produce a composite material that is based on aerogel granulate, that has a lower level of thermal conductivity, and is both mechanically stable and easy to manufacture in the form of mats or panels.

This problem has been solved by a composite material that contains at least one formation of fibrous materials and aerogel particles, which is characterised in that the fibrous formation contains at least one thermoplastic fibrous material with which the aerogel particles are connected and by which the fibres are connected to each other in the formation in such a way that the thermoplastic fibres at the surface are fused and on cooling result in a joining of the fibres to each other and to the aerogel particles. This thermal consolidation ensures a stable fibrous formation and ensures that the aerogel particles are bonded to the fibres.

Here, a fibrous formation in understood to be any formation that can be produced using a surface-forming technique. Examples of such surface formations are textile fabric, random-fibre matting, knitted fabrics, and fleeces, with fleeces being preferred.

Fleeces understood to include the so-called stable fibre mats, i.e., random-fibre mats of fibres that are of finite length, as well as spun-fibre mats, i.e., those that are of continuous fibres.

In the case of thermoplastic fibres, hereinafter referred to as the first fibre material, these can be fibres of a thermoplastic, organic material such as, for example, polyolefin fibres, polyamide fibres, or preferably polyester fibres. The fibres can be round, trilobal, pentalobal, octalobal, in the form of strips, or be shaped like fir trees, dumb bells, or otherwise. Hollow fibres can also be used. The first fibre materials can be a smooth or crimped.

In addition, the fibrous formation can contain at least one extra fibre material that is bonded to the first fibres of thermoplastic material during the thermal consolidation process. To this end, the melting point of the material from which these fibres are made may not be lower than the temperature at which the fleece becomes thermally consolidated. In the case of the fibres, these can be both inorganic fibres, such as mineral or glass fibres, or organic fibres, such as polyolefin, polyamide, or polyester fibres or mixtures thereof. It is preferred that the additional fibres be of the identical material as the first fibres, although of another profile, another diameter, or display another type of crimping and/or another degree of elongation.

The fibres can be modified by conventional additives, for example anti-static agents such as carbon black. The fibres that are contained in the formation can contain IR opacifiers, such an carbon black, titanium dioxide, iron oxide, or zirconium dioxide, as well as mixtures of these, in order to reduce the radiation contribution to thermal conductivity. The fibres may also be dyed in order that they are coloured.

The diameter of the fibres that are used in the composite material should preferably be smaller than the mean diameter of the aerogel particles, so that a high proportion of aerogel can be bound into the composite material. The selection of very fine fibres makes it possible to produce mats that are very flexible, whereas the use of thicker fibres results in bulkier mats that are stiffer on account of their greater resistance to bending.

The denier of the fibres is preferably between 0.8 and 40 dtex.

Mixtures of fibres that are of different materials, with different profiles and/or different deniers can also be used. Mixing in thicker fibres results in greater resistance to bending. In order to achieve good consolidation of the fleece, on the one hand, and to ensure good adhesion of the aerogel granulate on the other hand, the proportion by weight of the first, thermoplastic fibrous material should be between 10 and 100%-wt, preferably between 40 and 100%-wt, relative to the total quantity of fibre.

Of the spun fleeces, those that are of fibres of synthetic polymers, the so called spun bonds, are preferred; these are produced from random-laid freshly melt-spun filaments. They consist of continuous synthetic fibres that are of polymer materials that can be melt-spun. Suitable polymer materials are, for example, polyamides such as polyhexamethylene diadipamide, polycaprolactam, aromatic or partially aromatic polyamides (aramids), aliphatic polyamides such as nylon, partially aromatic or fully aromatic polyesters, polyphenylsulfide (PPS), polymers with ether or keto groups, such as polyetherketones (PEK) and polyetherether ketone(PEEK),or polybenzimidazoles.

It is preferred that the spun mats consist of melt-spinnable polyesters. In principle, all known polyester materials that are suitable for the production of fibres can be used. Polyesters of this kind consist mainly of building blocks that are derived from aromatic dicarboxylic acids and from aliphatic diols. Common aromatic dicarboxylic acid building blocks are the divalent radicals of bensenedicarboxylic acids, in particular of terephthalic acid and isophthalic acid. Common diols have 2 to 4 carbon atoms, ethylene glycol being particularly suitable. Particularly advantageous are spun fleeces that consist of at least 85 mol-% polyethylene-terephthalate. The remaining 15 mol-% is then built up from dicarboxyltc acid units and glycol units that act as so-called modifying agents and which permit the practitioner skilled in the art to alter the physical and chemical properties of the filaments that are produced. Examples of such dicarboxylic acid units are radicals of isophthalic acid or of aliphatic dicarboxylic acids such as, for example, glutaric acid, adipic acid, sebacic acid; examples of modifying diol radicals are ones of the long-chain diols such as propanediols or butanediol, of di- or triethylaneglycol or, to the extent that they are present in small quantities, of polyglycol with a molar weight of approximately 500 to 2000. Particularly preferred are polyesters that contain at least 95 mol-% polyethyleneterephalate (PET), in particular those of unmodified PET.

If the composite materials according to the present invention are also to have a flame-retardant effect, it is an advantage if they have been spun from flame-retardant modified polyesters. Such flame-retardant modified polyesters are known. They contain additives of halogen compounds, in particular bromine compounds or, what is particularly advantageous, they contain phosphonic compounds that are condensed into the polyester chain.

It is particularly preferred that the spun mat contain flame-retardant modified polyesters that are condensed into the chain component group of formula (I)

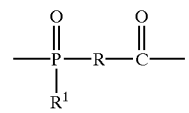

(1)

wherein R stands for alkylene or polymethylene with 2 to 6 carbon atoms or phenyl, and $R^1$ stands for alkyl with 1 to 6 carbon atoms, aryl, or aralkyl, these being condensed in. It in preferred that in Formula (1) R stands for ethylene and $R^1$ stands for methyl, ethyl, phenyl, or o-, m-, or p-methyl-phenyl, in particular methyl. Spun mats of this kind are described, for example, in DE-A-39 40 713.

It is advantageous that the polyesters contained in the spun fleeces have a molecular weight corresponding to an intrinsic viscosity (IV) of 0.6 to 1.4 as measured in a solution of 1 g polymer in 100 ml dichloracetic acid at 25° C.

The individual denier of the polyester filaments in the spun mats is between 1 and 16 dtex, preferably 2 to 8 dtex.

In another embodiment of the present invention, the spun fleece can also contain another fibre material as carrier fibres. Spun fleeces of this kind are described in EP-A-0, 446,822, EP-A-0,530,769, and EP-A-0,590,629.

Examples of polymers from which the carrier fibres can be derived are polyacrylonitrile, polyolefins such as polyethylene, essentially aliphatic polyamides such an nylon 6.6, essentially aromatic polyamides (aramids), such as poly-(p-phenylene terephthalate) or copolymers containing a proportion of aromatic m-diamine units to inprove solubility, or poly-(m-phenylene isophthalate), essentially aromatic polyesters such as poly-(p-hydroxybenzoate) or preferably essentially aliphatic polyesters such as polyethylene terephthalate.

The proportion of the two types of fibres relative to each other can be selected within a very wide range. although attention must be paid to the fact that the proportion of the thermoplastic fibres must be sufficiently great that the adhesion of the carrier fibres to the thermoplastic fibres makes the fleece material strong enough for the intended application. Then, the proportion of thermoplastic fibres usually amounts to less than 50%-wt relative to the weight of the mat material.

Suitable thermoplastic fibres are, in particular, modified polyesters with a melting point that is 10 to 50° C., and preferably 30 to 50° C. lower than that of the raw material used for the fleece material. Examples of ouch fibre materials are polypropylene, polybutylene terephthalate, or polyethylene terephthalate modified by condensing in longer-chain diols and/or isophthalic acid or aliphatic dicarboxylic acid.

The carrier fibres and the thermoplastic fibres are preferably built up from one class of polymer. It is to be understood that all the fibres that are used have been no selected from a class of substances that once the fleece reaches the end of its useful life, it can be recycled without any problem.

The individual fibre denier of the carrier fibres and of the thermoplastic fibres can be selected within very wide limits. Examples for such denier ranges are 1 to 16 dtex, preferably 2 to 6 dtex.

In one other embodiment, the spun fleece can be finally consolidated after mechanical consolidation by needling and/or by means of fluid jets, optionally with the help of a chemical binder, for example, one that is based on a polyacrylate.

The weight to area ratio of the spun fleece is between 20 and 500 g/cm², and between 30 and 250 g/m².

The volumetric percentage of the aerogel within the composite material should be as high as possible, and should amount to at least 40%, and should preferably be above 60%. In order to achieve mechanical stability of the composite material, the percentage should not, however, exceed 95%, and should preferably not be above 90%.

Aerogels that are suitable for the compounds according to the present invention are those that are based on metal oxides that are suitable for the sol-gel technique (C. J. Brinker, G. W. Scherer, *Sol-Gel Science*. 1990, Chaps. 2 and 3), for example, Si or Al compounds, or those based on organic substances that are suitable for the sol-gel technique, ouch as melamine-foraldehyde condensates (U.S. Pat. No. 5,086,085) or resorcinol-formaldehyde condensates (U.S. Pat. No. 4,873,218). They can also be based on mixtures of the above-cited materials. It is preferred that aerogels containing Si compounds, especially $SiO_2$ aerogels, and in particular $SiO_2$ aerogels, be used. The aerogel can contain IR opacifiers, such as carbon black, titanium dioxide, iron oxide, or zirconium dioxide, as well as mixtures of these, in order to reduce the radiation contribution to thermal conductivity.

Furthermore, the thermal conductivity of the aerogels decreases as porosity increases and density decreases. For this reason, aerogels with porosities of greater than 60% and densities of less than 0.4 g/cm$^3$ are especially preferred.

The thermal conductivity of the aerogel granulate should be less than 40 mW/mK, and in particular less than 25 mW/mK.

In one preferred embodiment, the aerogel particles have hydrophobic surface groups. In order to avoid any subsequent collapse of the aerogels by the condensation of moisture within the pores, it is advantageous if hydrophobic groups which are not split off when acted upon by water be present covalently on the inside surface of the aerogel. Preferred groups for the permanent hydrophobisation are trisubstituted silyl groups of the general formula —Si(R)$_3$, with trialkyls and/or triarylsilyl groups being preferred, with each R independently being a non-reactive, organic radical such as $C_1$–$C_{18}$-alkyl or $C_6$–$C_{14}$-aryl, preferably $C_1$–$C_6$ alkyl or phenyl, in particular methyl, ethyl, cyclohexyl, or phenyl, which can be additionally substituted with more functional groups. Particularly advantageous for permanent hydrophobisation of the aerogel is the use of trimethylsilyl groups. The incorporation of these groups can be effected as has been described in WO 94/25149, or it can be done by gas-phase reaction between the aerogel and an activated trialkylsilane derivative, such as chlortrialkysilane or a hexaalkylsilazane, for example (Cf. R. Iler, *The Chemistry of Silica*, Wiley & Sons, 1979).

The size of the grains will depend on the use to which the material is put. However, in order to be able to bind in a large percentage of aerogel granulate, the particles should be greater than the diameter of the fibres, preferably greater than 30 μm. In order to achieve a high level of stability, the granulate should not be too coarse, and the grains should preferably be smaller than 2 cm.

Granulate with a favourable bimodal grain size distribution can be used to achieve a high volumetric percentage of aerogel. Other distributions could also be used.

The fire rating of the composite material is determined by the fire rating of the aerogel and of the fibres. In order to arrive at the most favourable fire rating for the composite material, non-flammable fibres such as glass or mineral fibres, or fibres that are difficult to ignite, such as TREVIRA CS®, should be used.

If the composite material consists only of the fibrous formation that contains the aerogel particles, the aerogel granulate may break when the composite material is subjected to mechanical loads, or can break away from the fibres so that the fragments can fall out of the formation.

For this reason, for specific applications, it is advantageous that the fibre fleece be covered on one or both sides with, in each instance, at least one covering layer, which covering layers can be identical or different. As an example, the covering layers can be cemented over the thermoplastic fibres by means of another adhesive during thermal consolidation, the covering layer being, for example, preferably a metal foil or a metallised plastic film. In addition, the particular covering layer can itself consist of a plurality of layers.

What is preferred in a fibre-aerogel composite material in the form of mats or panel, which has a fibrous formation that contains an aerogel as the middle layer and on each aide has a covering layer, at least one of these covering layers containing layers of fine thermoplastic fibres, with the individual fibre layers being thermally consolidated in and of themselves and to each other. The covering layer can also contained bi-component fibres. Bi-component fibres are chemical fibres of two rigidly connected polymers that are of different chemical and or physical structure, which have areas with different melting points, i.e., areas of a low melting point and areas of a higher melting point. Typically, these fibres are in the form of a core-and-covering structure in which the low melting point components form the covering, or else they are of a side-by-side structure.

The choice of the fibres for the covering layer is governed by the same factors as those that govern the choice of fibres for the fibre formation in which the aerogel particles are bonded in. In order to obtain the densest possible covering layer, however, the fibres should be of a diameter smaller than 30 μm, and preferably smaller than 15 μm.

In order to arrive at the greatest stability or density of the surface layers, the layers in the covering layer can be needled.

A further object of the present invention is to describe a process for manufacturing the composite material according to the present invention.

Production of the composite material according to the present invention is described in detail below with respect to the preferred fibre mat, although it is not restricted to this period Yorker.

Either staple fibres in the form of commercially available cardings or cards of continuous fibres are used to manufacture the fibre fleece. Whereas the fleece can be laid up using the procedures familiar to the practitioner skilled in the art, the aerogel granulate is scattered. Attention must be paid to achieving the most even possible distribution of the granulate grains when the aerogel granulate is introduced into the fibre composite. This can be done by using commercially available sprinkling apparatuses.

When a covering layer is used, it is possible to lay up the fibre fleece on a covering layer when the aerogel is being sprinkled on; once this process is ended, then the upper covering layer is put in place.

It covering layers that are of finer fibre material are used, the covering layer that is of fine fibres and/or bi-component fibres is laid up using known processes and optionally needled as described above; the fibre composite that contains the aerogel is then placed on this. For a further, upper covering layer, a layer can be laid up using fine fibres and/or bi-component fibres, as for the lower covering layer, and then optionally needled.

The resulting fibre composite is thermally bonded, optionally under pressure, at temperatures above the melting point of the fibre material that has the lowest melting point. The pressure is between normal pressure and the compressive strength of the aerogel that is used. The length of time that the temperature acts on the material is to be selected so as to ensure that only the surfaces of the fibres melt.

The complete processing procedures can, if preferred, be carried out continuously using installations familiar to the practitioner skilled in the art, Because of their low thermal conductivity, the panels and mat according to the present invention are suitable for use as thermal insulation material.

In addition to this, the panels and mat according to the present invention can be used as sound absorbing material, either directly or in the form of resonance absorbers since they have a low acoustic velocity and, compared to monolithic aerogels, they provide greater acoustic attenuation. In addition to the damping effect of the aerogel material, depending on the permeability of the fibre fleece, there is also additional damping caused by air friction between the pores in the fibrous formation. The permeability of the fibre fleece can be adjusted by changing the diameter of the fibres, the density of the fleece, and the grains size of the aerogel particles. If the fibrous formation also contains covering layers, these covering layers should permit the sound waves to penetrate into the fibrous formation and not reflect the sound waves to any great extent.

In addition to the foregoing, because of the porosity of the fibrous formation and, in particular, the great porosity and the surface to volume ratio of the aerogels, the panels and mat according to the prevent invention are also suitable as adsorption materials for liquids, vapours, and gases. A specific adsorption effect can be achieved by modifying the surface of the aerogel.

The present invention will be described in greater detail below on the basis of embodiments, without however being restricted to these.

EXAMPLE 1

A fibre mat with a surface to weight ratio of 100 g/=$^2$ was laid up from 50%-wt TREVIRA 290 0.8 dtex/38 mm hm and 50%-wt TREVIRA fused adhesive fibre 3.3 dtex/60 mm hm (test fibre). During the laying-up process, an aerogel granulate based on tetraethylorthosilicate with a density of 150 kg/m$^3$ and a thermal conductivity of 23 mW/mK, and with a grain size of 1 to 2 mm diameter was applied to this by sprinkling.

The resulting fibre composite material was thermally bonded at a temperature of 160° C. for 5 minutes, and compressed to a thickness of 1.4 cm.

The resulting panel was easily bent. Its thermal conductivity was measured by a panel method according to DIN 52612 Part 1, and determined to be 27 mW/mK.

EXAMPLE 2

A mat used as the lower layer was laid up from 50%-wt TREVIRA 120 staple fibres with a denier of 1.7 dtex, length 35 mm, spun black, and 50%-wt TREVIRA fused adhesive fibre, 3.3 dtex/60 mm hm (test fibres). This covering layer had a surface to weight ratio of 100 g/m$^2$. A fibre mat of 50%-wt TREVIRA 292, 40 dtex/60 mm hm and 50%-wt TREVIRA fused adhesive fibre 3.3 dtex/60 mm hm (test fibre) with a surface to weight ratio of 100 g/m$^2$ was placed on this. During the laying-up process, an aerogel granulate based on tetraethylorthosilicate with a density of 150 kg/m$^3$ and a thermal conductivity of 23 mW/mK, and with a grain size of 2 to 4 mm diameter was applied to this by sprinkling.

A covering layer structured in the same way as the lower covering layer was then placed on this fibre mat containing the aerogel.

The resulting fibre composite material was thermally bonded at a temperature of 160° C. for 5 minutes, and compressed to a thickness of 1.5 cm. The percentage of aerogel in the consolidated mat amounted to 51%. Its thermal conductivity was measured by a panel method according to DIN 52612 Part 1, and determined to be 29 mW/mK.

What is claimed is:

1. A composite material which comprises a fiber formation said fiber formation comprises fibrous materials, which comprise, as a binder, at least one thermoplastic fibrous material, and aerogel particles, wherein the fibers in the thermoplastic fibrous material are the sole binder and bind the thermoplastic fibers to each other and to the aerogel particles.

2. The composite material as defined in claim 1, wherein the fiber formation is a fiber fleece.

3. The composite material as defined in claim 1, wherein the fiber formation further comprises at least one other fiber material.

4. The composite material as defined in claim 1, wherein the thermoplastic fibrous material has a linear density in the range from 0.8 to 40 dtex.

5. The composite material as defined in claim 1, wherein the proportion of aerogel particles within the composite material is at least 40%-vol.

6. The composite material as defined in claim 1, wherein that the aerogel is an $SiO_2$ aerogel.

7. The composite material as defined in claim 1, wherein the thermoplastic fibrous material and/or the aerogel particles comprise at least one infrared opacifier.

8. The composite material as defined in claim 1, wherein the aerogel particles have porosities of greater than 60%, densities below 0.4 g/cm$^3$, and thermal conductivities of less than 40 mW/mK.

9. The composite material as defined in claim 8, wherein the thermal conductivities is less than 25 mW/mK.

10. The composite material as defined in claim 1, wherein the aerogel particles have hydrophobic surface groups.

11. The composite material as defined in claim 2, wherein the fiber fleece has a covering layer on one or both sides, said covering layers being identical or different.

12. The composite material as defined in claim 11, wherein the covering layers comprise plastic films, metal films, metallised plastic films, or layers of mat wherein the mat comprises fibers selected from the group consisting of simple fibers and bi-component fibers.

13. The composite material as defined in the claim 1, which is in the form of a panel or mat.

14. A process for producing a composite material as defined in claim 1, which comprises sprinkling the aerogel particles into a fiber formation, which comprises at least one thermoplastic fiber material, and thermally consolidating the resulting fiber composite at temperatures above the melting point of the fiber material, optionally under pressure.

15. A thermal or sound insulation material which comprises a composite according to claim 1.

16. A material for the absorption of gases, vapors, and liquids which comprise a composite according to claim 1.

17. A composite material which comprises a fiber formation said fiber formation comprises fibrous materials, which comprise at least two thermoplastic fibrous materials with one thermoplastic material having a higher melting point and, as a binder, the second thermoplastic material having a lower melting point, and aerogel particles, wherein the fibers in the second thermoplastic are the sole binder and bind the thermoplastic fibers to each other and to the aerogel particles.

18. A process for producing a composite material as defined in claim 17, which comprises sprinkling the aerogel particle into a fiber formation which comprises at least two thermoplastic materials, one material having a higher melting point and one material having a lower melting point, and thermally consolidating the resulting fiber composite at temperatures above the melting point of the material having the lower melting point, optionally under pressure.

* * * * *